(12) United States Patent
Weng et al.

(10) Patent No.: US 7,764,273 B2
(45) Date of Patent: Jul. 27, 2010

(54) TOUCH PANEL FOR MOUNTING ON A DISPLAY PANEL

(75) Inventors: Chien-Sen Weng, Chupei (TW); Masataka Itoh, Nara (JP)

(73) Assignee: Au Optronics Corporation, Hsinchu (TW)

( * ) Notice: Subject to any disclaimer, the term of this patent is extended or adjusted under 35 U.S.C. 154(b) by 986 days.

(21) Appl. No.: 11/020,197

(22) Filed: Dec. 27, 2004

(65) Prior Publication Data

US 2006/0001651 A1  Jan. 5, 2006

(30) Foreign Application Priority Data

Jun. 30, 2004  (TW) ................ 93119654 A

(51) Int. Cl.
*G06F 3/041* (2006.01)
*G06F 3/044* (2006.01)

(52) U.S. Cl. .................. 345/173; 341/33; 178/18.06

(58) Field of Classification Search ............... 345/173, 345/178; 341/33, 34; 178/18.06
See application file for complete search history.

(56) References Cited

U.S. PATENT DOCUMENTS

| | | | | |
|---|---|---|---|---|
| 5,270,711 A | * | 12/1993 | Knapp | 341/34 |
| 5,774,107 A | * | 6/1998 | Inou | 345/104 |
| 5,867,151 A | * | 2/1999 | Nakai | 345/173 |
| 6,392,636 B1 | * | 5/2002 | Ferrari et al. | 345/173 |
| 6,501,529 B1 | * | 12/2002 | Kurihara et al. | 349/160 |
| 6,828,805 B2 | * | 12/2004 | Izumi et al. | 324/686 |
| 2003/0206263 A1 | * | 11/2003 | Hinata | 349/149 |
| 2005/0190161 A1 | * | 9/2005 | Hong et al. | 345/173 |

* cited by examiner

*Primary Examiner*—Richard Hjerpe
*Assistant Examiner*—Steven E Holton
(74) *Attorney, Agent, or Firm*—Thomas, Kayden, Horstemeyer & Risley, LLP

(57) ABSTRACT

A touch panel includes a TFT array having a plurality of thin film transistors; a plurality of signal lines disposed within the TFT array, each of the signal lines being electrically connected to a respective one of the transistors; a transparent conductive pattern layer disposed above the plurality of signal lines and electrically connected to each of the transistors; a flexible conductive layer; and a spacing pattern layer supporting flexible conductive layer to space the flexible conductive layer apart from the transparent conductive pattern layer. When pressure is applied onto the flexible conductive layer, the flexible conductive layer contacts the transparent conductive pattern layer to transmit an electrical signal via the signal lines into the TFTs to indicate the point of contact.

24 Claims, 6 Drawing Sheets

TOUCH PANEL FOR MOUNTING ON A DISPLAY PANEL

FIELD OF THE INVENTION

The present invention relates to a touch panel for mounting on a display panel of a display device, such as a liquid crystal display (LCD) system, and more particularly to a touch panel that is provided with a fingerprint recognizing technology.

BACKGROUND OF THE INVENTION

Touch panels mounted on the display panels of the LCDs have become more and more commonplace as their prices has dropped over the past years. The touch panel itself serves as input and output devices and is generally mounted on a personal digital assistant (PDA) or a handheld computers in order to replace the function of a keyboard, thereby minimizing a storage space. The PDA is often used by a consumer to conduct daily performances, such as taking memos, for storing addresses and phone numbers, taking notes and keeping track of daily business appointments and etc.

Referring to FIG. 1, a typical touch panel 10 of resistance system is shown, is adapted to be mounted on a display panel of a portable PDA because the latter has simple circuit structure and does not require special input device, and includes a indium tin oxide (ITO) layer 12, an ITO film 16, and a plurality of spacers 14 disposed between so as to insulate one from the other. The ITO layer 12 is generally mounted on the display panel while the ITO film 16 is disposed above the ITO layer 12 via the spacers 14. The opposite sides 12a, 12b of the ITO layer 12 have different voltage levels, a voltage gradient is resulted in the ITO layer 12 and extends in the Y direction. In the similar manner, another voltage gradient is resulted in the ITO film 16, and extends along X direction perpendicular to the Y direction by virtue of different voltage levels at two opposite sides 16a, 16b thereof. When a user touches the ITO film 16, the two contact each other and the change in the electrical field is noted and the coordinates of the point of contact are calculated. Once the coordinates are known, a special driver translates the signal at four corners of the ITO film 16 so as to identify the point of contact. Note that the touch panel 10 of the resistance system can only detect a single point of contact, and is unable to detect a finger print pattern having several ridges and valleys forming several points of contact.

FIG. 2A shows a top planar view of a conventional touch panel 20 provided with a fingerprint recognizing technology. FIG. 2B shows a cross-sectional view of the conventional touch panel 20 taken along lines a-a in FIG. 2A, and is mounted on the display panel 30 of an LCD system. The conventional touch panel 20 includes a TFT array, a plurality of data lines 24, a plurality of scanning lines 26, a transparent conductive pattern layer 27, a transparent flexible conductive film 28, and a spacing pattern layer 29. The data and scanning lines 24, 26 criss-cross one another to form a plurality of square configurations, each between adjacent pairs of the lines 24,26. The thin film transistor (TFT) array includes a plurality of thin film transistors 22, each is disposed within a respective square configuration, and has a drain D, a gate G respectively connected to a respective data line 24 and a respective scanning line 26, and a source S. The transparent conductive pattern layer 27 is disposed above the data and scanning lines 24,26, and includes a plurality of conductive islets 27a, each of which fills a respective square configuration and is connected to the source of a respective thin film transistor 22. The flexible conductive film 28 is disposed above the transparent conductive pattern layer 27. The spacing pattern layer 20 is disposed on the display panel 30, disposed on the touch panel 20 surrounding in such a manner to support the flexible conductive film 28 thereabove so as to space the flexible conductive film 28 apart from the transparent conductive pattern layer 27. When a user's finger touches the flexible conductive film 28, a signal is transmitted to the sources S of the TFTs 22 via the conductive islet 27a, where the scanning lines 26 scan the data lines 24 consecutively via the TFTs 22 so as to identify the coordinates of the points of contact.

The light provided by the backlight module in the LCD system reaches the aforesaid conventional touch panel only after passing through the display panel 30, transparent conductive pattern layer 27 and flexible conductive film 28 to show the image. Though the transparent conductive pattern layer 27 is made from ITO or indium zinc oxide (IZO) for providing highly-transparent ratio, during the traveling of light through the touch panel 20, a portion of the light is absorbed by the transparent conductive pattern layer 27 and will affect the luminance efficiency of the display panel 30. In case the touch panel 20 covers partially of the display panel 30 so as to provide fingerprint-recognizing ability, the portion of the display panel 30 covered by the touch panel 20 is poorly illuminated when compared to the remaining portion of the display panel 30. Accordingly, how to improve the transparent conductive pattern layer 27 of transparent ratio for the display quality of display panel 30 has a very important effect.

SUMMARY OF THE INVENTION

One object of the present invention is to provide a touch panel that is provided with fingerprint recognizing technology and that permits effective passage of light therethrough so as to provide uniform light brightness through the touch panel.

According to one aspect of the present invention, a touch panel having a fingerprint domain is provided and comprises: a TFT array, disposed on a display panel, including a plurality of thin film transistors and a plurality of signal lines; a transparent conductive pattern layer disposed above the signal lines and electrically connected to the TFTs; a spacing pattern layer disposed on the display panel and surrounding the fingerprint domain; and a flexible conductive layer disposed on the spacing pattern layer. When pressure is applied onto the flexible conductive layer, the flexible conductive layer contacts the transparent conductive pattern layer to transmit an electrical signal via the signal lines into the TFTs to indicate the point of contact.

In another aspect of the present invention, a flat display device is provided to comprise: a display panel; and a touch panel disposed on the display panel, the touch panel defining a fingerprint domain, and the touch panel comprising: a TFT array, disposed on the display panel, having a plurality of TFTs and signal lines; a transparent conductive pattern layer disposed above the signal lines and electrically connected to the TFTs; a spacing pattern layer disposed on the display panel and surrounding the fingerprint domain; and a flexible conductive layer disposed on the spacing pattern layer. When pressure is applied onto the flexible conductive layer, the flexible conductive layer contacts the transparent conductive pattern layer to transmit an electrical signal via the signal lines into the TFTs to indicate the point of contact.

BRIEF DESCRIPTION OF THE DRAWINGS

The foregoing aspects and many attendant advantages of the present invention will become more readily appreciated as the same becomes better understood by reference to the following detailed description, when taken in conjunction with the accompanying drawings, of which.

DETAILED DESCRIPTION OF THE PREFERRED EMBODIMENTS

Figure 1:
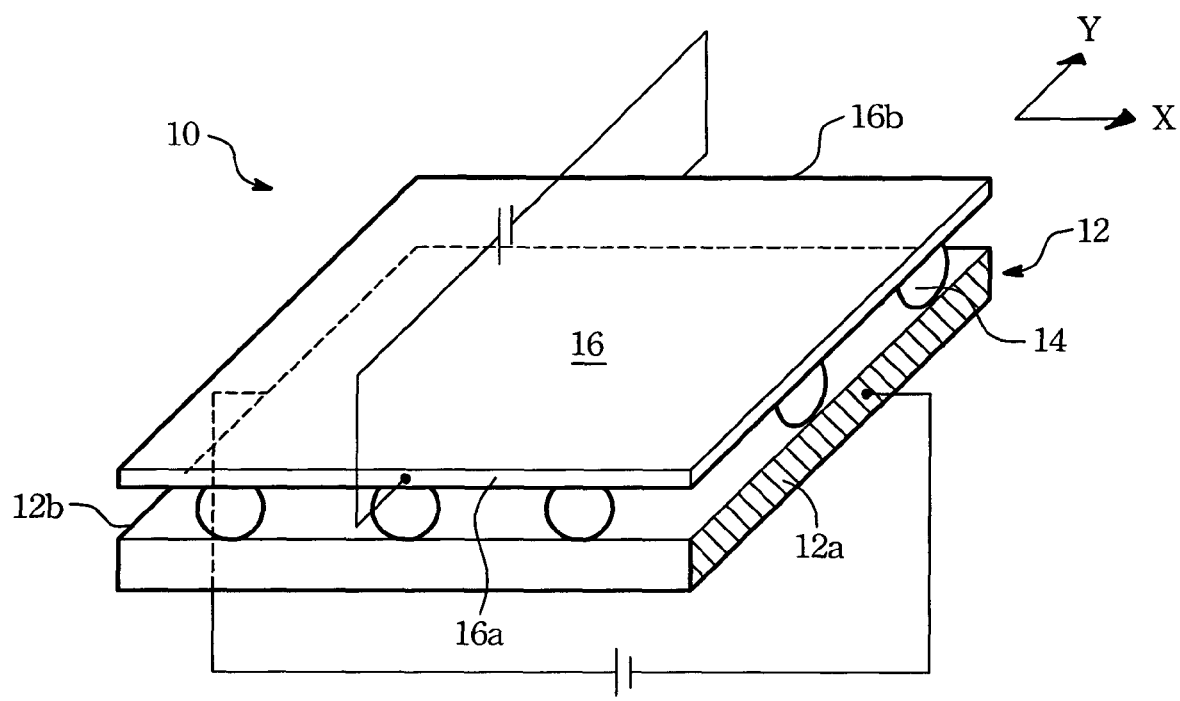
FIG. 1 is a perspective and partly sectional view of a conventional touch panel.
Figure 2A:
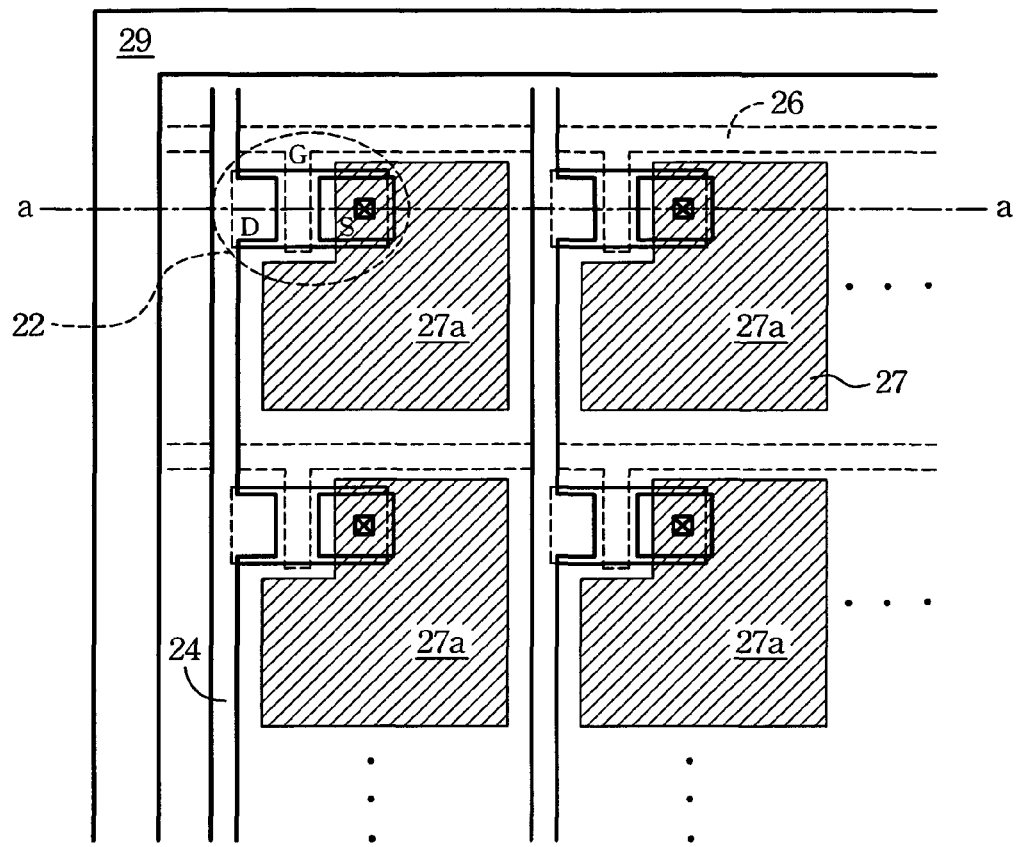
FIG. 2A is a fragmentary top planar view of another conventional touch panel.
Figure 2B:
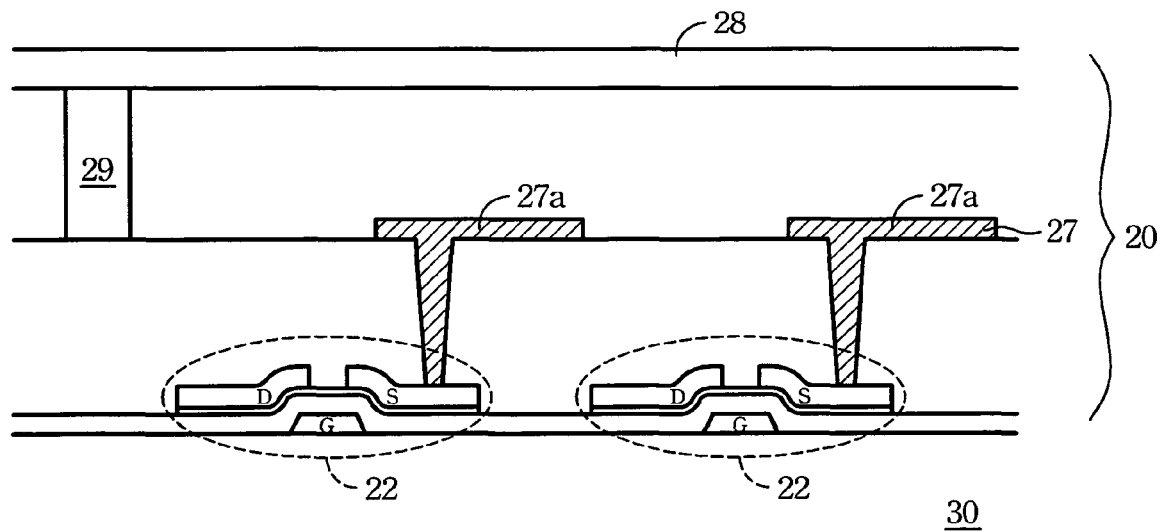
FIG. 2B is a cross-sectional view of another conventional touch panel mounted on a display panel of an LCD system.
Figure 3:
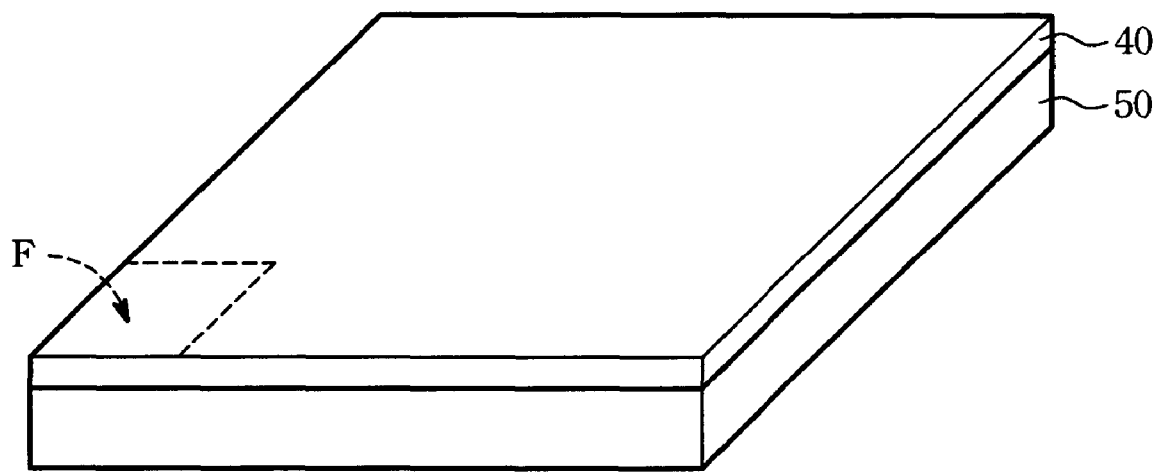
FIG. 3 is a perspective view, illustrating the first embodiment of the touch panel according to the present invention mounted on a display panel of an LCD system.

Referring to FIG. 3, the first embodiment of a touch panel 40 according to the present invention is mounted on the display panel 50 of a flat display device, such as an LCD system. The first embodiment of the touch panel 40 defines a fingerprint domain F at one corner thereof.

Figure 4A:
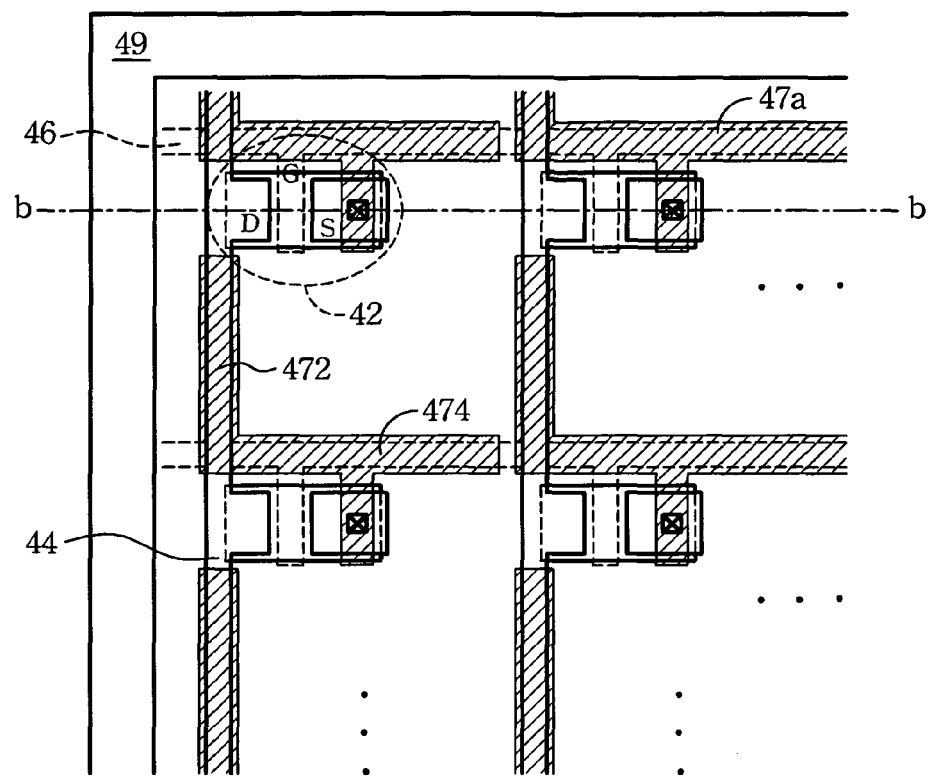
FIG. 4A is a fragmentary top planar view of the first embodiment of the touch panel according to the present invention.
Figure 4B:
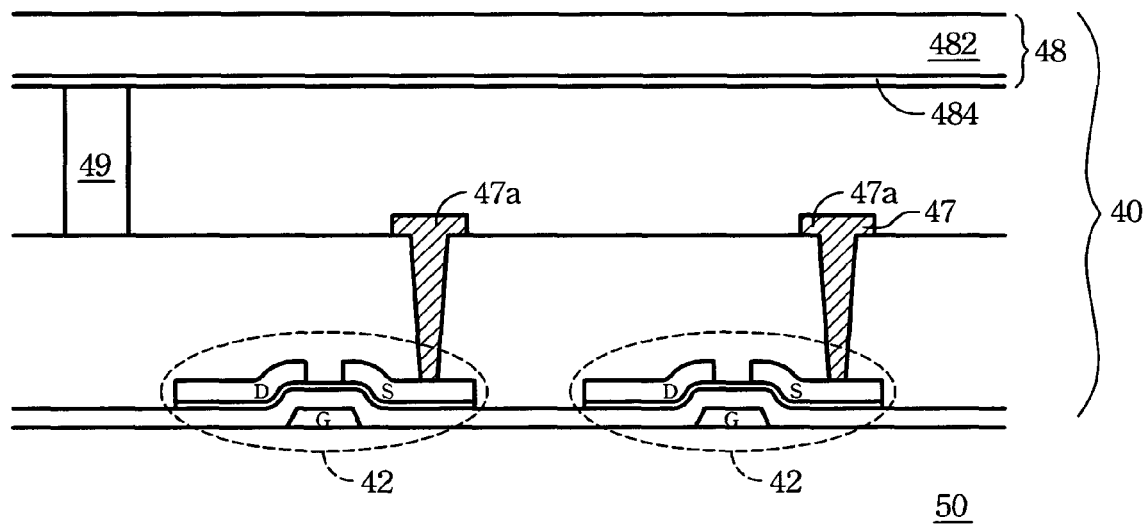
FIG. 4B is a cross-sectional view, illustrating the first embodiment of the touch panel according to the present invention mounted on a display panel of an LCD system.

FIGS. 4A and 4B respectively show top planar view and cross-section view of the fingerprint domain F taken along lines b-b. The first embodiment of the touch panel 40 at the fingerprint domain F, includes a TFT array, a plurality of signal lines 44, 46, a transparent conductive pattern layer 47, a flexible conductive layer 48, and a spacing pattern layer 49. The TFT array is disposed on the display panel 50 within the fingerprint domain F, and includes a plurality of thin film transistors 42. The signal lines are disposed on the display panel 50, and include a plurality of data lines 44 extending in a first direction and a plurality of scanning lines 46 transversely crossing the data lines 44 in a second direction so as to form a chessboard-like arrangement. The data and scanning lines 44,46 are disposed within the TFT array. Each of the TFTs 42 has a gate G, a drain D which are respectively and electrically connected to corresponding ones of the data and scanning lines 44, 46 and a source S. In present embodiment, the first direction can be a vertical direction, while the second direction can be a horizontal direction perpendicular to the vertical direction.

The transparent conductive pattern layer 47 is preferably made from indium tin oxide or indium zinc oxide, and is disposed above the scanning and data lines 44, 46, and includes a plurality of conductive islets 47a. Each of the conductive islets 47a is electrically connected to the source S of a respective transistor 42. FIG. 4A shows one embodiment of the present invention, in which each of the conductive islets 47a has a horizontal portion 474 disposed above and extending along a respective scanning line 46 and a vertical portion 472 disposed above and extending along a respective data line 44. The horizontal portion 474 and the vertical portion 472 cooperatively form a substantially L-shaped configuration. The width of the vertical and horizontal portions 472 and 474 of each conductive islets 47a is substantially smaller than 8 times of the width of the data and scanning lines 44, 46. However, in the preferred embodiment of the present invention, the width of the vertical and horizontal portions 472 and 474 of each conductive islets 47a is substantially 1 to 1.5 times of the width of the data and scanning lines 44, 46 so as not to interfere the light passing through the touch panel of the present invention. In other words, the width of the vertical portion and the horizontal portions 472 and 474 of each conductive islets 47a is substantially greater than or equal to the width of the data and scanning lines 44, 46.

The flexible conductive layer 48 is disposed above the transparent conductive pattern layer 47, and includes an insulated flexible base 482 and an electrically conductive layer 484 disposed on the insulated flexible base 482. In other words, the electrically conductive layer 482 of the flexible conductive layer 48 is opposite to the display panel 50. The electrically conductive layer 484 is preferably made from an indium tin oxide (ITO) or indium zinc oxide (IZO) or metal or metal alloy or like. The spacing pattern layer 49 is disposed on the display panel 50, confines the fingerprint domain F therein, and supports the electrically conductive layer 484 above so as to space the flexible conductive layer 48 apart from the transparent conductive pattern layer 47.

A detection circuit (not visible) is provided and is electrically connected to the data lines 44 and the flexible conductive layer 48 in such a manner that when a user's finger touches the fingerprint domain F in the flexible conductive layer 48, the latter contacts the corresponding conductive islets 47a in the transparent conductive pattern layer 47 so as to generate an electrical signal which is inputted into the TFTs 42 via the respective source S. At the same time, a scanning signal is inputted into the TFTs 42 via the scanning lines 46 so as to transfer the electrical signal to the detection circuit, thereby identifying the points of contact. Although, the TFTs 42 disclosed in FIG. 4B is bottom-gate type structure. Nevertheless, the scope of the present invention should not be limited thereto since the TFTs 42 serves as switches in the embodiment. Under this condition, the TFT having top-gate type structure can also be employed in the embodiment so long as it permit the signal to pass therethrough. Note the arrangement of the conductive islets 47a in the present embodiment, since the vertical and horizontal portions 472, 474 respectively partially overlap the corresponding data and scanning lines 44, 46, light passage through the touch panel is not interfered, thereby providing uniform brightness throughout thereof. In addition, since the fingerprint recognizing function is resulted whenever pressure is applied on the respective domain F (i.e. pressing the corresponding conductive islets 47a), the size of the latter does not affect transfer of the signal to the detection circuit. Under this condition, the width of the conductive islet 47a can be reduced, which, in turn, results in widening of the adjacent pair of the conductive islets 47a, thereby increasing the fingerprint recognizing ability of the touch panel 40 of the present invention.

Figure 5:
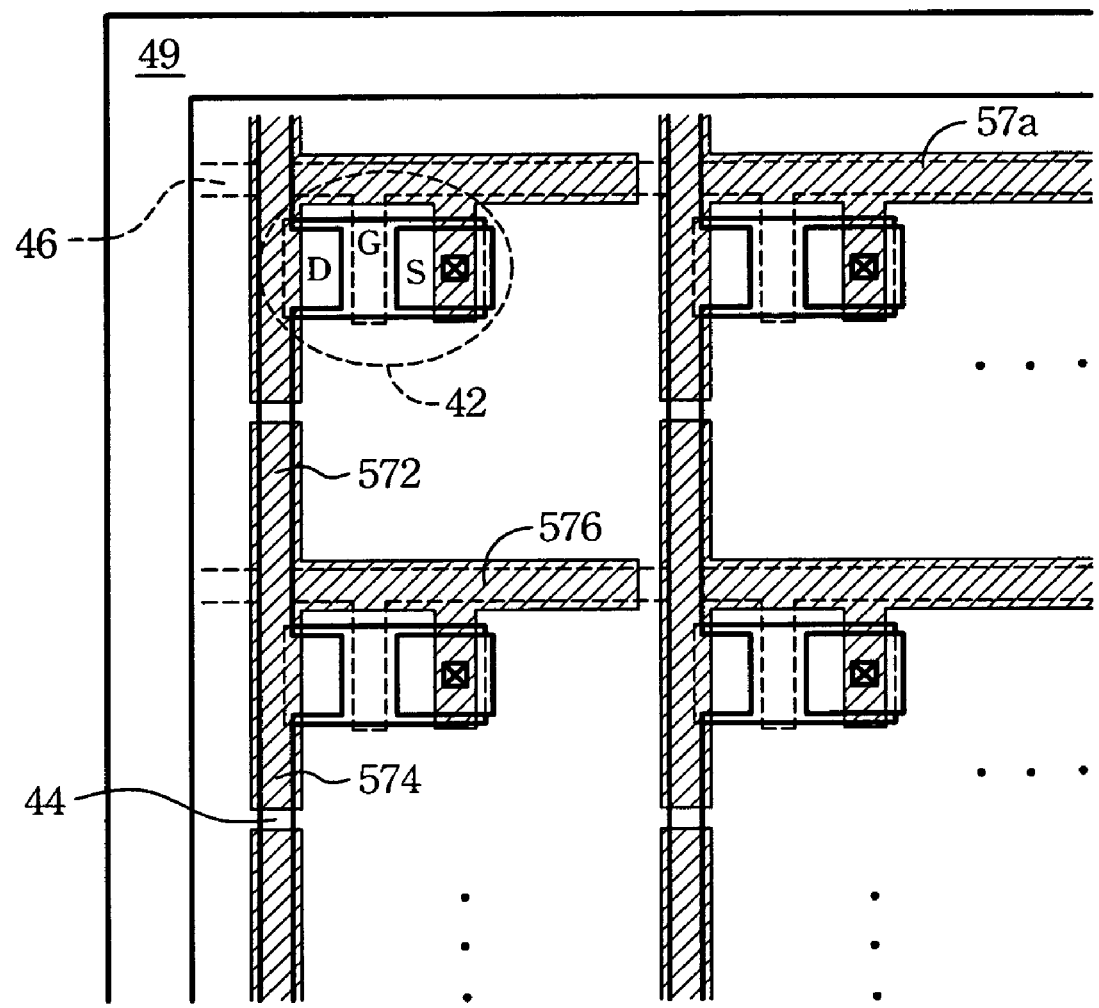
FIG. 5 is a fragmentary top planar view of the second embodiment of the touch panel according to the present invention.

Referring to FIG. 5, a top planar view of the second embodiment of a touch panel of the present invention is shown to have the construction similar to that of the first embodiment. The main difference resides in that each of the conductive islets 57a of the transparent conductive pattern layer 57 is substantially T-shaped configuration, and has two vertical portions 572, 574 disposed above and extending along a respective data line 44, while the horizontal portion 576 extends midway from the vertical portions 572, 574, and is disposed above a respective scanning line 46. Note that vertical portions 572, 574 of an adjacent pair of the conductive islets 57a should be spaced apart from each other in order to provide precise identification of the points of contact on the fingerprint domain. The width of the vertical portions 572, 574 and horizontal portion 576 of each conductive islets 57a is substantially smaller than 8 times of the width of the data and scanning lines 44, 46. In other words, the width of the vertical portions 572, 574 and the horizontal portion 576 of each conductive islets 57a is substantially greater than or equal to the width of the data and scanning lines 44, 46.

Figure 6:
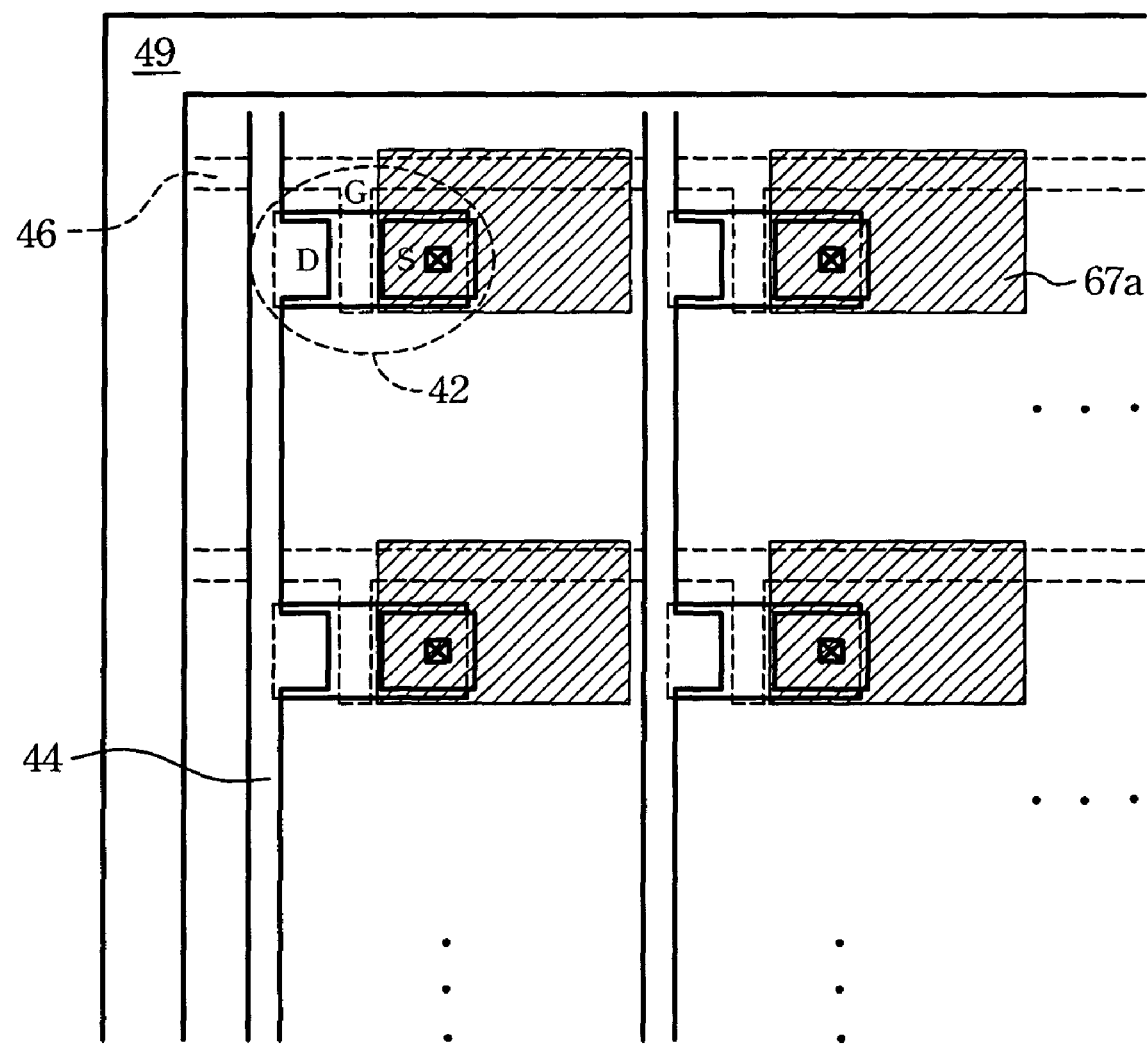
FIG. 6 is a fragmentary top planar view of the third embodiment of the touch panel according to the present invention.

Referring to FIG. 6, a top planar view of the third embodiment of a touch panel of the present invention is shown to have the construction similar to that of the second embodiment. The main difference resides in that each of the conductive islets 67a of the transparent conductive pattern layer is disposed adjacent to the intersection position of the data and scanning lines 44, 46, and extends along the scanning line 46 or data lines 44 (no shown). Each conductive islets 67a has a width substantially greater than the width of the horizontal portion 576 of FIG. 5. In order to avoid poor detection of a fingerprint, the width of the conductive islets 67a can be increased to 8 times of the respective scanning line 46 without interfering the light passage therethrough.

As a matter fact a human fingerprint generally ranges 400 um to 500 um. In order to provide precise fingerprint recognizing ability, the adjacent pairs of the data lines 44 and the scanning lines 46 should be spaced from each other in less than 100 um. An important aspect to note is that the light for illuminating the touch panel 40 of the present invention is supplied by a backlight module disposed within the display panel 50. The light provided by the backlight module reaches the touch panel 40 only after passing through the display panel 50. In other words, the light beams emitted by the backlight module must pass through the display panel 50 prior to reaching the touch panel 40. Under this condition, the signal lines within the touch panel 40 and the display panel 50 may hinder smooth passage of light beams in case the signal lines are not properly arranged. In order not to hinder the smooth passage of light beams through the touch panel 40 and the display panel 50, the manufacturers generally arranged the signal lines 44,46 in the touch panel 40 in such a manner to respectively overlap and align with the signal lines within the display panel 50, thereby providing the highest light transmission rate through the panels 40,50. Another aspect to note is that through only one portion F of the touch panel 40 according the present invention is arranged to have the fingerprint recognizing ability, as shown in FIG. 3, the scope to the invention should not limited thereto. If desired, the flexible conductive layer 48 in the touch panel 40 can be arranged in such a manner to cover substantially the entire surface of the display panel 50. The transparent conductive pattern layer 47 is accordingly to complement the flexible conductive layer 48 so as to provide a plurality of fingerprint domains F in the touch panel 40.

As understood by a person skilled in the art, the foregoing preferred embodiments of the present invention is of illustrative rather than limiting thereon. It is intended to cover various modifications and similar arrangements included within the spirit and scope of the appended claims, the scope of which should be accorded the broadest interpretation so as to encompass all such modifications and similar structure.

What is claimed is:

1. A touch panel having a fingerprint domain, comprising:
   a TFT array, disposed on a display panel, including a plurality of thin film transistors and a plurality of signal lines, wherein the signal lines and the thin film transistors define a plurality of pixels;
   a transparent conductive pattern layer disposed above said signal lines, defining a plurality of conductive islets aligned and overlapping with said signal lines respectively, and electrically connected to said TFTs, wherein each of the conductive islets is substantially only located in a peripheral area of a respective pixel;
   a spacing pattern layer disposed on the display panel and surrounding the fingerprint domain; and
   a flexible conductive layer disposed on said spacing pattern layer;
   whereby when pressure is applied onto said flexible conductive layer, said flexible conductive layer contacts said transparent conductive pattern layer to transmit an electrical signal via said signal lines into said TFTs to indicate the point of contact.

2. The touch panel according to claim 1, wherein said transparent conductive pattern layer defines a plurality of conductive islets.

3. The touch panel according to claim 1, wherein said signal lines comprise a plurality of data lines.

4. The touch panel according to claim 1, wherein said signal lines comprise a plurality of scanning lines.

5. The touch panel according to claim 1, wherein said transparent conductive pattern layer has a width substantially greater than or equal to a width of each of said signal lines.

6. The touch panel according to claim 5, wherein said transparent conductive pattern layer has a width substantially smaller than 8 times of a width of each of said signal lines.

7. The touch panel according to claim 1, wherein said transparent conductive pattern layer includes indium tin oxide or indium zinc oxide.

8. The touch panel according to claim 1, wherein said flexible conductive layer includes a flexible base and an electrically conductive layer facing the display panel.

9. The touch panel according to claim 8, wherein said electrically conductive layer includes indium tin oxide or indium zinc oxide.

10. The touch panel according to claim 8, wherein said electrically conductive layer includes a metal or a metal alloy.

11. The touch panel according to claim 1, wherein said flexible conductive layer covers substantially the entire surface of the display panel.

12. A flat display device comprising:
    a display panel; and
    a touch panel, disposed on the display panel, the touch panel defining a fingerprint domain and including:
    a TFT array, disposed on the display panel, having a plurality of TFTs and signal lines, wherein the signal lines and the TFTs define a plurality of pixels,
    a transparent conductive pattern layer disposed above said signal lines, defining a plurality of conductive islets aligned and overlapping with said signal lines respectively, and electrically connected to said TFTs, wherein each of the conductive islets is substantially only located in a peripheral area of a respective pixel,
    a spacing pattern layer disposed on the display panel and surrounding the fingerprint domain; and
    a flexible conductive layer disposed on said spacing pattern layer;
    whereby when pressure is applied onto said flexible conductive layer, said flexible conductive layer contacts said transparent conductive pattern layer to transmit an electrical signal via said signal lines into said TFTs to indicate the point of contact.

13. The flat display device according to claim 12, wherein said transparent conductive pattern layer defines a plurality of conductive islets.

14. The flat display device according to claim 12, wherein said signal lines includes a plurality of data lines.

15. The flat display device according to claim 12, wherein said signal lines includes a plurality of scanning lines.

16. The flat display device according to claim 12, wherein said conductive pattern layer has a width substantially greater than or equal to a width of each of said signal lines.

17. The flat display device according to claim 16, wherein said conductive pattern layer has a width substantially smaller than 8 times of a width of each of said signal lines.

18. The flat display device according to claim 12, wherein said transparent conductive pattern layer includes indium tin oxide or indium zinc oxide.

19. The flat display device according to claim 12, wherein said flexible conductive layer includes a flexible base and an electrically conductive layer facing the display panel.

20. The flat display device according to claim 19, wherein said electrically conductive layer includes indium tin oxide or indium zinc oxide.

21. The flat display device according to claim 19, wherein said electrically conductive layer includes a metal or a metal alloy.

22. A fingerprint recognizing system for a display panel, comprising:
- a TFT array, disposed on the display panel, each of said TFTs having a gate, source and drain;
- a plurality of signal lines disposed within said TFT array, each of said signal lines being electrically connected to said gates and drains of said TFTs, respectively, wherein said signal lines define a plurality of pixels and each of said TFTs is located in each of said pixels;
- a transparent conductive pattern layer disposed above said signal lines, defining a plurality of conductive islets aligned and substantially only overlapping with said signal lines respectively, and electrically connected to said sources of said TFTs, wherein said signal lines and said thin film transistors define a plurality of pixels;
- a spacing pattern layer disposed on the display panel;
- a flexible conductive layer disposed on said spacing pattern layer; and
- a detecting unit electrically connected to said flexible conductive layer for detecting a pressure applied on said flexible conductive layer;
- whereby when pressure is applied onto said flexible conductive layer, said flexible conductive layer contacts said transparent conductive pattern layer to transmit an electrical signal via said signal lines into said TFTs to indicate the point of contact.

23. A touch panel having a fingerprint domain, comprising:
- a TFT array, disposed on a display panel, including a plurality of thin film transistors and a plurality of signal lines, wherein said signal lines define a plurality of pixels and each of said TFTs is located in each of said pixels;
- a transparent conductive pattern layer disposed above said signal lines, defining a plurality of conductive islets overlapping with said signal lines respectively, and electrically connected to said TFTs, wherein each of said conductive islets is substantially only located in a peripheral area of a respective pixel;
- a spacing pattern layer disposed on the display panel and surrounding the fingerprint domain; and
- a flexible conductive layer disposed on said spacing pattern layer;
- whereby when pressure is applied onto said flexible conductive layer, said flexible conductive layer contacts said transparent conductive pattern layer to transmit an electrical signal via said signal lines into said TFTs to indicate the point of contact.

24. A touch panel having a fingerprint domain, comprising:
- a TFT array, disposed on a display panel, including a plurality of thin film transistors and a plurality of signal lines;
- a transparent conductive pattern layer disposed above said signal lines, defining a plurality of conductive islets aligned and overlapping with said signal lines respectively, and electrically connected to said TFTs, wherein substantially all of each conductive islet is overlapping with said signal lines;
- a spacing pattern layer disposed on the display panel and surrounding the fingerprint domain; and
- a flexible conductive layer disposed on said spacing pattern layer;

whereby when pressure is applied onto said flexible conductive layer, said flexible conductive layer contacts said transparent conductive pattern layer to transmit an electrical signal via said signal lines into said TFTs to indicate the point of contact.

* * * * *